US009866346B2

United States Patent
Ji et al.

(10) Patent No.: US 9,866,346 B2
(45) Date of Patent: Jan. 9, 2018

(54) REDUNDANCY PROTECTION FOR RECONFIGURABLE OPTICAL ADD/DROP MULTIPLEXING (ROADM) BRANCHING UNIT

(71) Applicant: NEC Laboratories America, Inc., Princeton, NJ (US)

(72) Inventors: Philip Nan Ji, Cranbury, NJ (US); Ting Wang, West Windsor, NJ (US); Ryuji Aida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/279,399

(22) Filed: Sep. 28, 2016

(65) Prior Publication Data

US 2017/0117982 A1    Apr. 27, 2017

Related U.S. Application Data

(60) Provisional application No. 62/246,887, filed on Oct. 27, 2015.

(51) Int. Cl.
    *H04J 14/02*    (2006.01)
    *H04Q 11/00*    (2006.01)

(52) U.S. Cl.
    CPC ...... *H04J 14/0212* (2013.01); *H04Q 11/0005* (2013.01); *H04J 14/021* (2013.01); *H04J 14/0201* (2013.01); *H04Q 2011/0015* (2013.01); *H04Q 2011/0058* (2013.01)

(58) Field of Classification Search
    None
    See application file for complete search history.

(56) References Cited

U.S. PATENT DOCUMENTS

| | | | | |
|---|---|---|---|---|
| 6,249,510 B1* | 6/2001 | Thompson | .......... | H04J 14/0283 370/222 |
| 7,835,645 B2* | 11/2010 | Eiselt | .................. | H04J 14/0204 398/50 |
| 8,116,623 B2* | 2/2012 | Chung | ................ | H04J 14/0204 398/12 |
| 2006/0013587 A1* | 1/2006 | Scott | ................... | H04J 14/0204 398/83 |
| 2007/0274724 A1* | 11/2007 | Gumaste | ............. | H04J 14/0212 398/83 |
| 2010/0086301 A1* | 4/2010 | Fujita | .................. | H04J 14/0204 398/48 |
| 2010/0142961 A1* | 6/2010 | Wisseman | .......... | H04J 14/0212 398/83 |
| 2012/0301141 A1* | 11/2012 | Sakamoto | ........... | H04J 14/0204 398/48 |
| 2013/0259475 A1* | 10/2013 | Ji | ....................... | H04Q 11/0005 398/48 |
| 2014/0147121 A1* | 5/2014 | Matsukawa | ......... | H04J 14/0204 398/83 |

(Continued)

*Primary Examiner* — Ken N Vanderpuye
*Assistant Examiner* — Jai Lee
(74) *Attorney, Agent, or Firm* — Joseph Kolodka

(57) ABSTRACT

Aspects of the present disclosure describe systems, structures and methods providing fully reconfigurable optical add-drop multiplexing (ROADM) that provide redundancy protection against any two (2) simultaneous wavelength selective switch (WSS) failures with only four 2×1 WSS structures for both Eastbound and Westbound traffic, while not requiring bidirectional operation of the WSS structures.

12 Claims, 12 Drawing Sheets

(56) References Cited

U.S. PATENT DOCUMENTS

2014/0286637 A1* 9/2014 Kikuchi .............. H04J 14/0212
 398/48
2015/0333855 A1* 11/2015 Gebauer .................. H04R 3/00
 381/119
2016/0269809 A1* 9/2016 Jiang .................. H04Q 11/0005

* cited by examiner

REDUNDANCY PROTECTION FOR RECONFIGURABLE OPTICAL ADD/DROP MULTIPLEXING (ROADM) BRANCHING UNIT

CROSS REFERENCE TO RELATED APPLICATION

This application claims the benefit of U.S. Provisional Application Ser. No. 62/246,887 filed Oct. 27, 2015 which is incorporated by reference as if set forth at length herein.

TECHNICAL FIELD

This disclosure relates generally to optical communications systems and methods. More particularly, this disclosure relates to methods and systems for redundancy protection for reconfigurable optical add/drop multiplexing (ROADM) branching unit.

BACKGROUND

As is known, optical networks—and in particular submarine optical networks—are an increasingly important component of the backbone of global communication networks. One particularly important component of these optical networks are optical add/drop multiplexing (OADM) and reconfigurable optical add/drop multiplexing (ROADM) units.

Accordingly, given the importance of ROADM systems to contemporary communications technologies, methods and structures that enhance or otherwise facilitate their operation would represent a welcome addition to the art.

SUMMARY

An advance in the art is made according to the present disclosure which describes systems, structures and methods providing fully reconfigurable optical add-drop multiplexing (ROADM) that provide redundancy protection against any two (2) simultaneous wavelength selective switch (WSS) failures with only four 2×1 WSS structures for both Eastbound and Westbound traffic, while not requiring bidirectional operation of the WSS structures.

Notably—and in sharp contrast to the prior art—systems, structures and methods according to the present disclosure provide low cost, fully functional and high reliability for ROADM that are fully-reconfigurable while exhibiting redundancy protection without sacrificing transmission performance.

Viewed from a first aspect, a system according to the present disclosure employs three 2×2 cross-connect switches and two, 2×1 switches configured with wavelength-selective switches (WSS) in all paths such that full reconfigurability and secure data delivery is provided wherein the combination and interconnection of 2×2 switches, 1×2 switches, optical splitters, and WSS's within the ROADM system is further configured to provide redundancy protection including a simultaneous failures of any two WSS's.

Finally, and of further advantage, and as will be shown and quantified, systems, structures and methods according to the present disclosure produce significant performance improvements in while reducing cost of operation.

BRIEF DESCRIPTION OF THE DRAWING

A more complete understanding of the present disclosure may be realized by reference to the accompanying drawing in which:

FIG. 2(b) with add/drop to a branch terminal;

Figure 1:
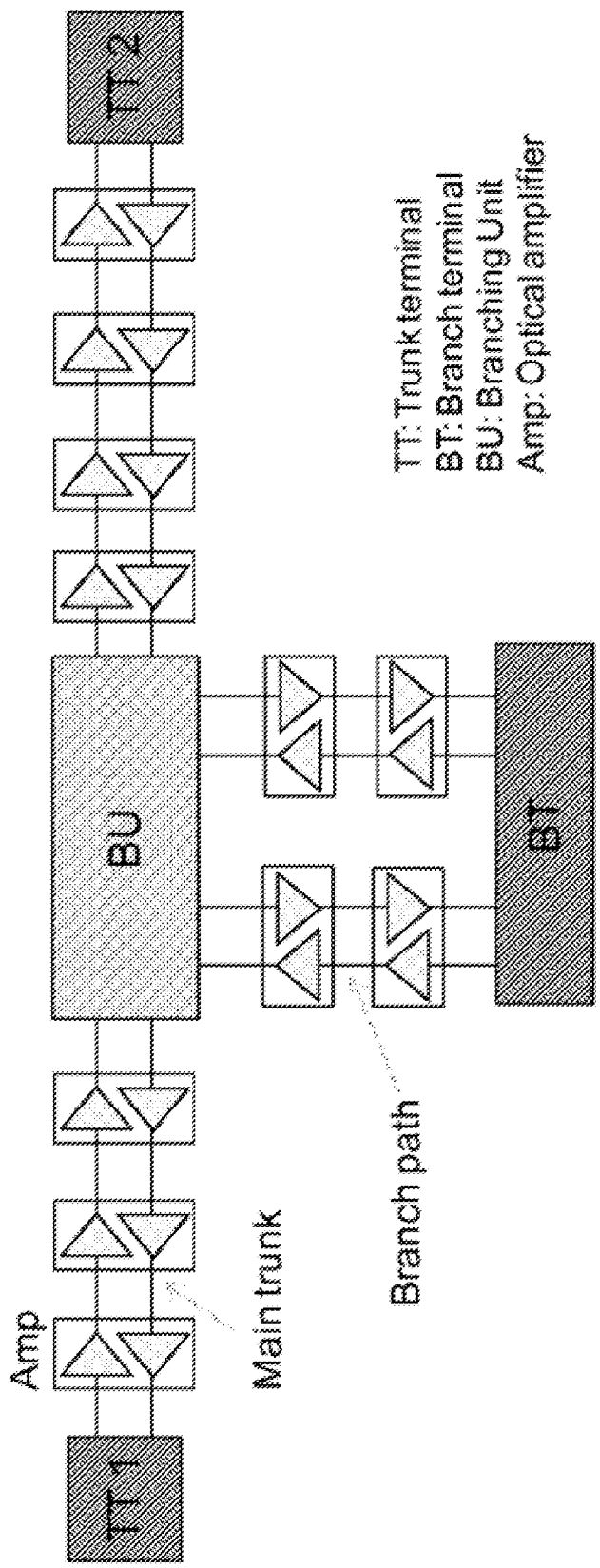
FIG. 1 is a schematic block diagram illustrating a submarine communications unit including a branch unit (BU)

The illustrative embodiments are described more fully by the Figures and detailed description. Inventions according to this disclosure may, however, be embodied in various forms and are not limited to specific or illustrative embodiments described in the Figures and detailed description

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGs comprising the drawing are not drawn to scale.

By way of some additional background, we again note the importance of optical networks and in particular submarine optical networks in contemporary communications. Such submarine optical networks will generally include one or more main trunks that connect trunk terminals—which generally are point-to-point links—with in-line optical amplifiers to boost signal power, and branch path(s) that connect to other branch terminals.

A branching unit (BU) is a network element that splits signals between the main trunk and the branch path and vice versa. This allows signals from different paths to share the same fiber, instead of installing dedicate fiber pairs for each link. The signal splitting and combining function of the BU is usually performed optically, therefore the BU has a function similar to that of an optical add/drop multiplexer (OADM) in terrestrial WDM networks.

FIG. 1 shows a schematic illustrating an existing, illustrative submarine communication system that includes two trunk terminals, one branch terminal and one BU that links a main trunk with the branch path. As may be readily observed by inspecting FIG. 1, bidirectional fiber transmission is illustrated. Note that as illustrated in this figure there are two pairs of optical fiber between the BU and the branch terminal (BT). One optical fiber pair connects Trunk Terminal 1 to the branching terminal, while the second optical fiber pair connects Trunk Terminal 2 and the branch terminal. As may be appreciated by those skilled in the art, this connection scheme advantageously allows reuse of the same wavelengths in the TT1-BT path and the TT2-BT path.

Figure 2A:
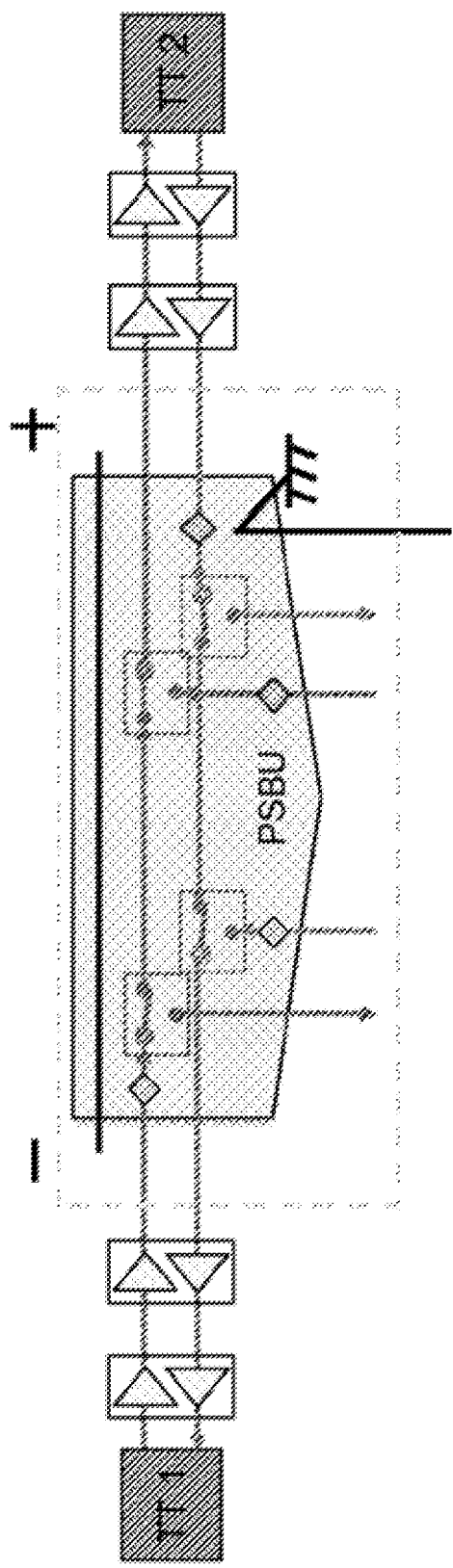
FIG. 2(a) and FIG. 2(b) show schematic diagram(s) illustrating a structure of a branching unit FIG. 2(a) without add/drop.
Figure 2B:
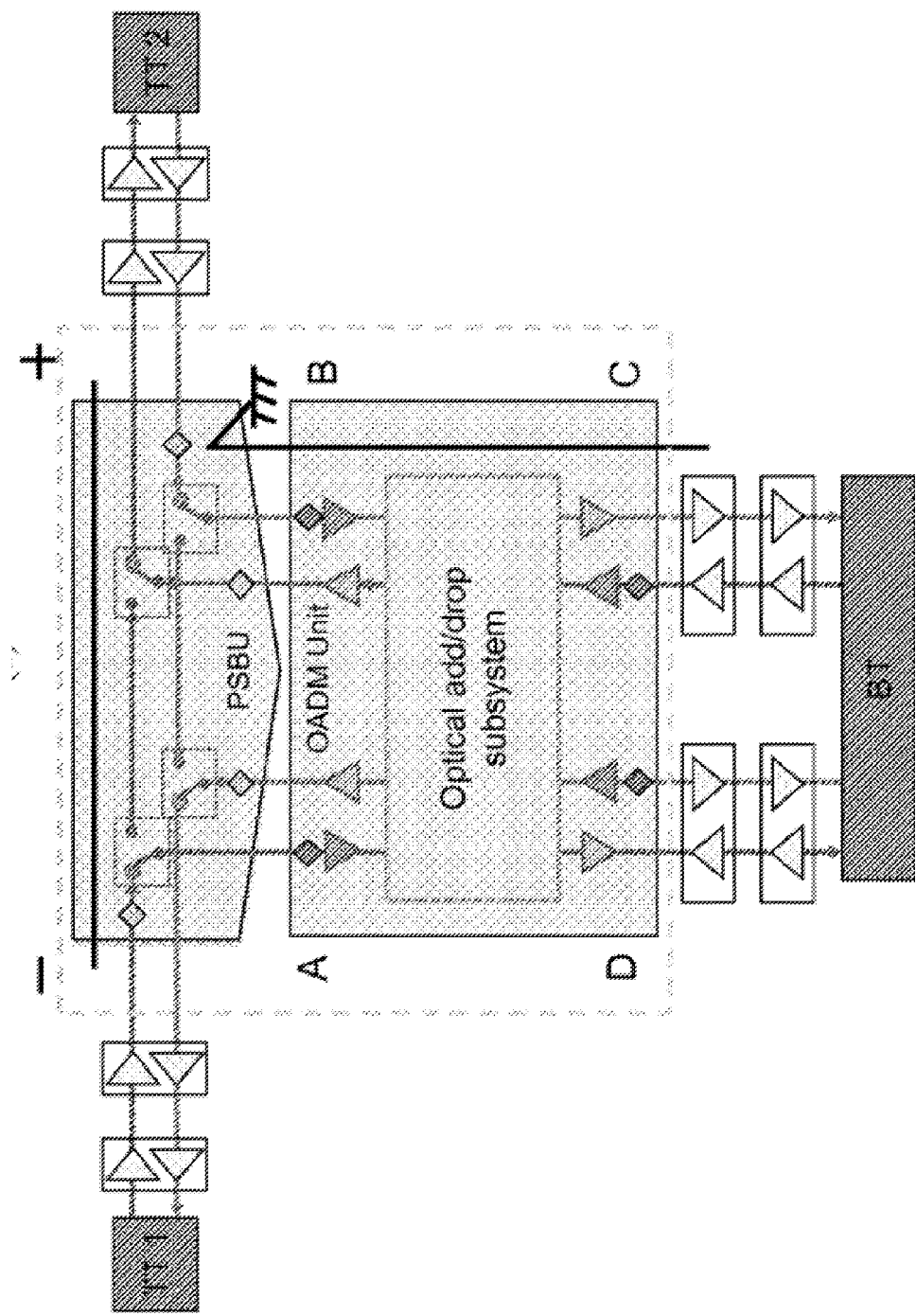

FIG. 2(a) shows an illustrative structure of a branching unit without an add/drop unit and FIG. 2(b) shows an illustrative structure of a branching unit with add/drop to branch terminal. As will be appreciated, a BU generally includes two subcomponents—a power switched branching unit (PSBU) and an OADM unit. The PSBU is inserted in the main trunk, and has several 1×2 switches. It then may control whether there will be an add/drop to a branch terminal. If there is no branching path connected, or if add/drop to the branch terminal is not required, the switches will send the signals directly along the trunk path (FIG. 2(a)). As may be appreciated by those skilled in the art, this is useful to pre-set a branching point for future use.

In situations where add/drop is required—the OADM unit is connected to the PSBU and the 1×2 switches in the PSBU are switched to send signals to/from the OADM unit—as shown in FIG. 2(b). Inside the OADM unit, a wavelength add/drop subsystem is shown connecting 4 fiber pairs (or alternatively 3 pairs, if there's only one branch fiber pair), and performs wavelength add/drop functions according to the network requirement. These 4 fiber pairs and their respective ports are labeled A, B, C, and D in the figures, where ports A and B are connected to the main trunk through the PSBU, and ports C and D are connected to the branch terminal. Oftentimes, there are optical signal monitors at each input port, and optical amplifiers at the input and output of each port.

In the OADM unit, signals from A can be directed to either B (through to the opposite trunk terminal) or D (where it is dropped to the branch terminal). Notably, the signal(s) may sometimes be directed to both—if multicasting or broadcasting is required. They do not need to return to A, and do not need to be directed to C since they can reach the branch terminal via D. Similarly, signals from B can be directed to either A or C, and do not need to go to D or go back to B.

Figure 3:
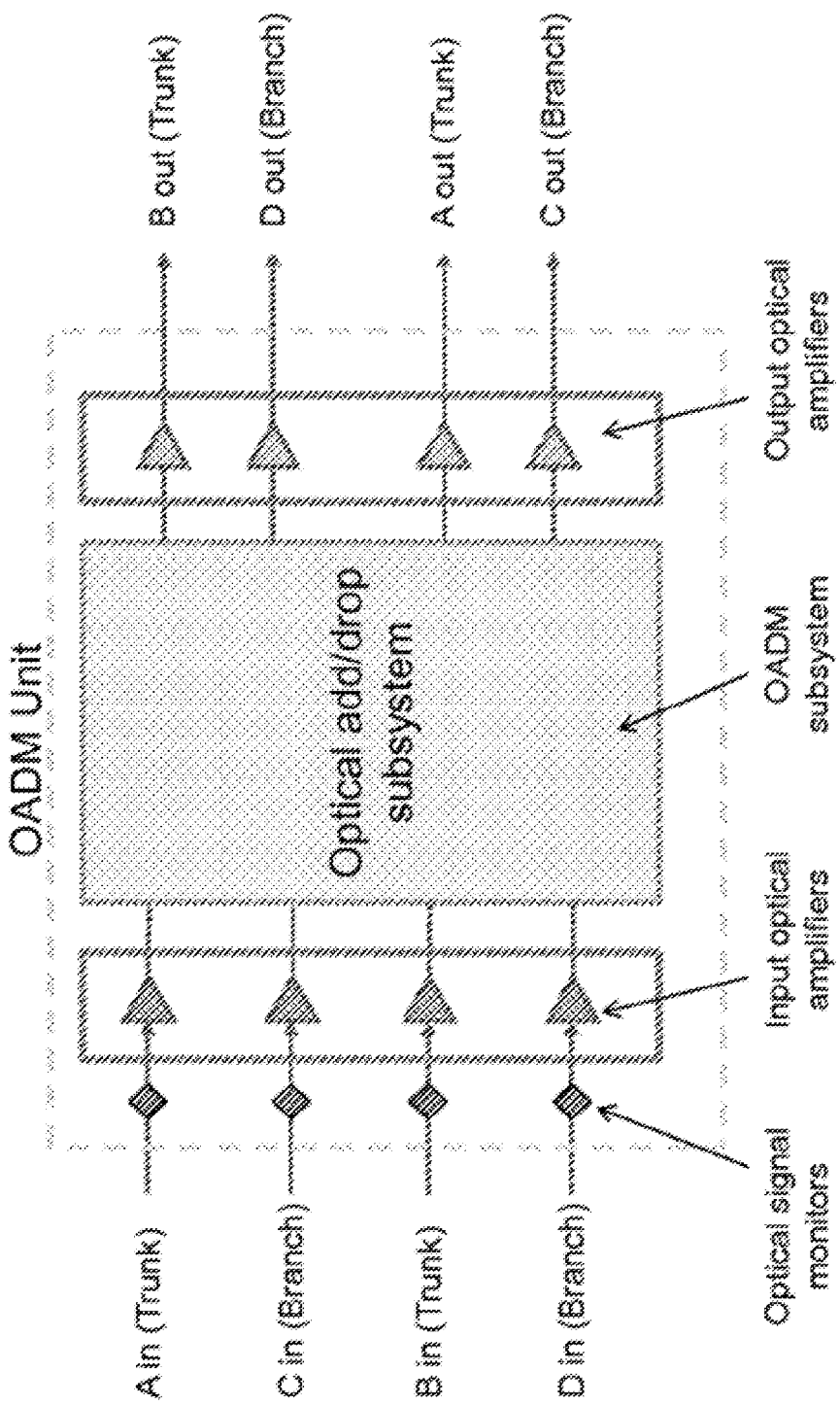
FIG. 3 is a schematic diagram depicting an illustrative OADM unit configuration according to an aspect of the present disclosure.

Similarly, branch terminal signals from D to A (added signal) or be returned to the branch terminal via C (even though these returned signals do not carry useful information, these optical channels are needed to keep the optical power in a transmission fiber at a balance/constant level. Consequently, they are often called "dummy light"). Such signals do not need to go to B (the signals to be added to the other trunk terminal are sent through C), and do not need to be returned to D (the signals to be returned to branch terminals are sent to D as dummy light). Similarly, branch terminal signals from C can go to B or C, and do not need to go to A or go back go C. Therefore, the signal paths inside and outside the branching unit can be separated into two separated groups, represented by blue arrows/components and red arrows/components as depicted in FIG. 2(a) and FIG. 2(b). These two color groups also represent the eastbound (blue) and westbound (red) traffics. The 4-input-4-output OADM unit can be redrawn as depicted in FIG. 3 which shows in schematic form an illustrative OADM unit configuration.

As will surely be appreciated by those skilled in the art, one key element when designing a BU is the design the optical add/drop subsystem. Therefore in the bulk of this disclosure, we do not emphasize those components that are not related to switching or reconfiguration (such as amplifiers, power monitors, and power supplies)—instead focusing on the design, configuration and implementation of optical add/drop subsystem (OADM subsystem).

Conventional BU and submarine network(s) employ fixed, pre-determined wavelength arrangement(s), therefore no reconfiguration is required. However, traffic carried in global communications networks is becoming more dynamic as Internet-based traffic becomes more dominant. Therefore, wavelength reconfigurability is required for next generation submarine network(s), with reconfigurable BUs as a key enabling element.

Historically, various submarine network BU architectures have been proposed to add reconfigurability and to achieve reconfigurable optical add/drop multiplexing (ROADM) functionality between a main trunk and branch path(s) in submarine network(s). Effectively, an OADM unit becomes a ROADM unit, and an OADM subsystem becomes a ROADM subsystem. These prior-art architectures and associated techniques include using tunable filters, filter array(s) with switch(es), wavelength-selective switches (WSS), 2×2 switches in bidirectional demultiplexer-switch-multiplexer (DSM) system, 1×2 switches in split-and-select DSM system(s), 1:2 interleaver with source tuning, 2:2 interleaver with source tuning, etc. REF [1] describes these architectures, and compares their various features, including reconfigurability, number of branch fiber pairs, latching capability, and broadcasting feature, etc. Also disclosed are more details and reference(s) for each architecture.

Among these prior-art architectures, Wavelength Selective Switch (WSS)-based architecture(s) arguably provide the highest level of reconfigurability. For example, 2K configurations can be achieved, where K is the number of WDM channels at the narrowest channel spacing acceptable in the system. In comparison, tunable filter-based architectures can deliver K configurations while 2×2 switch-based architecture(s) can deliver 2B configurations, wherein B is the number of wavebands—which is a several times smaller than K. Notably, interleaver-based architecture(s) can deliver 2K12 configurations if there is only one branching split, and fewer configurations at higher split numbers.

As will be appreciated, a WSS is a key optical component for wavelength switching in terrestrial ROADM nodes. As is known, it has reached a technological maturity in the past decade and is widely available commercially from multiple optical component vendors. Consequently, it is likely that WSS-based architecture(s) will be employed as a main solution for submarine reconfigurable branching unit design.

Unlike terrestrial networks however, underwater section(s) of submarine optical networks—sometimes called the "wet plant"—including the branching unit, have very high reliability requirement(s). This is due—in part—to the physical location and operating environment for underwater equipment, i.e., deep sea, ocean bottom. In such underwater environment(s), the required time and effort to identify fault(s) and to repair damage(s) in submarine networks is much greater than in terrestrial networks. Therefore, the reliability of branching unit equipment is very important.

Historically, several measures have been employed in the art to address reliability issues in such networks. For example, where submarine-grade devices are used, these devices generally exhibit a low Failure in Time (FIT) rate—which is a measure of the number of failures that can be expected in one billion device-hours of operation. Additionally, it is desirable to use only passive devices or devices having a latching feature—which means that switches will maintain their switching setting even after power is cut or otherwise turned off. Since contemporary, reconfigurable BUs require active switches to provide reconfigurability—except very few examples (See, e.g., REF 2) where reconfigurability is controlled at a terminal node—switches with a latching feature are highly desirable. However—despite certain technology proposals (see, e.g, REF 3), a latching WSS is still not yet commercially available.

Another approach to increase BU reliability is to add redundancy so that during a failure of hardware, the BU can be protected—i.e. maintaining all or partial functions. As used herein, the term hardware failure refers specifically to the failure of WSS, since the remaining optical components are either passive (such as optical couplers and splitters) or have latching capability and have easy control (such as small port count 1×2 or 2×2 switches). Notably, WSS exhibits complex control due to its high integration level and large number of control elements.

As a result, and as will be readily appreciated by those skilled in the art, one aspect of the present disclosure focuses on WSS-based, fully reconfigurable submarine branching unit(s)—especially the ROADM subsystem—with hardware redundancy features. Worth noting, and besides the WSS hardware redundancy, the branching unit also needs to have good (acceptable) optical performance and low cost.

Figure 4:
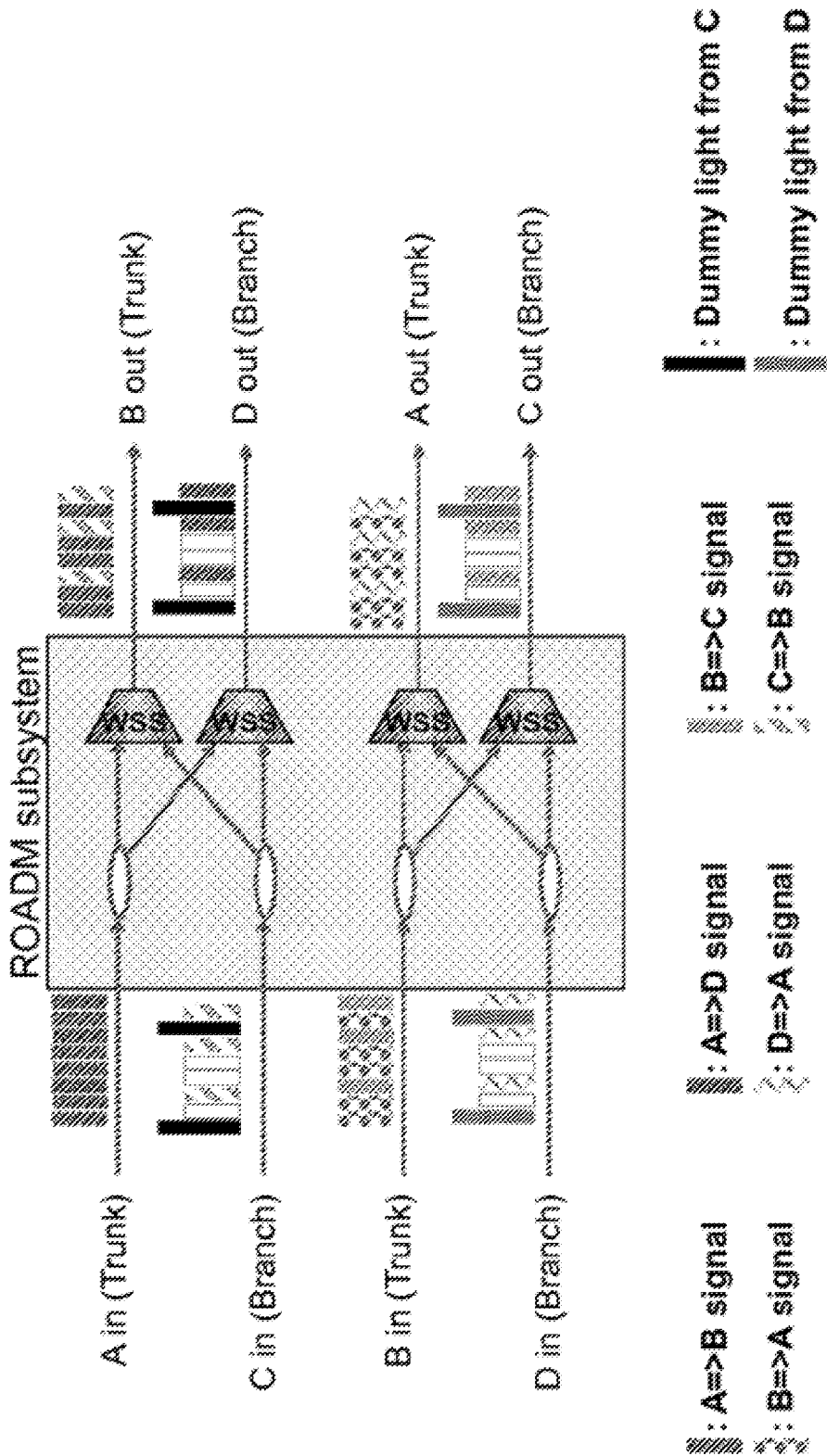
FIG. 4 is a schematic diagram depicting an illustrative splitter-switch WSS-based ROADM subsystem according to an aspect of the present disclosure.

As will be appreciated by those skilled in the art, since ROADM subsystems in submarine branching units are 4-input-4-output ROADM (such as that depicted in FIG. 3 with full reconfigurability), a target set of specifications for ROADM subsystem design may be more specifically described as:

Provide full reconfigurability through the use of WSS;
There are only up to 4 WSS devices in the ROADM unit for both "eastbound" and "westbound" traffic;
Preferably use only 1×2 WSS (same as 2×1 WSS), instead of higher port count WSS (such as 4×1WSS);
When up to 2 WSS fail, the ROADM unit will maintain all switching (add/drop/through) functions with redundancy;
Exhibit satisfactory transmission performance; and
Maintain power balance in all fiber paths FIG. 4 shows a configuration of a 4-input-4-output WSS-based ROADM subsystem. At each input, an optical splitter is used to split a signal into two paths, one for an opposite trunk terminal, the other for a branch terminal. At each output, a WSS is used to select only an appropriate signal for the destination terminal, therefore it achieves full reconfigurability with 4 WSS devices. Note however, that if any single WSS fails, the ROADM function cannot be fully maintained.

Figure 5:
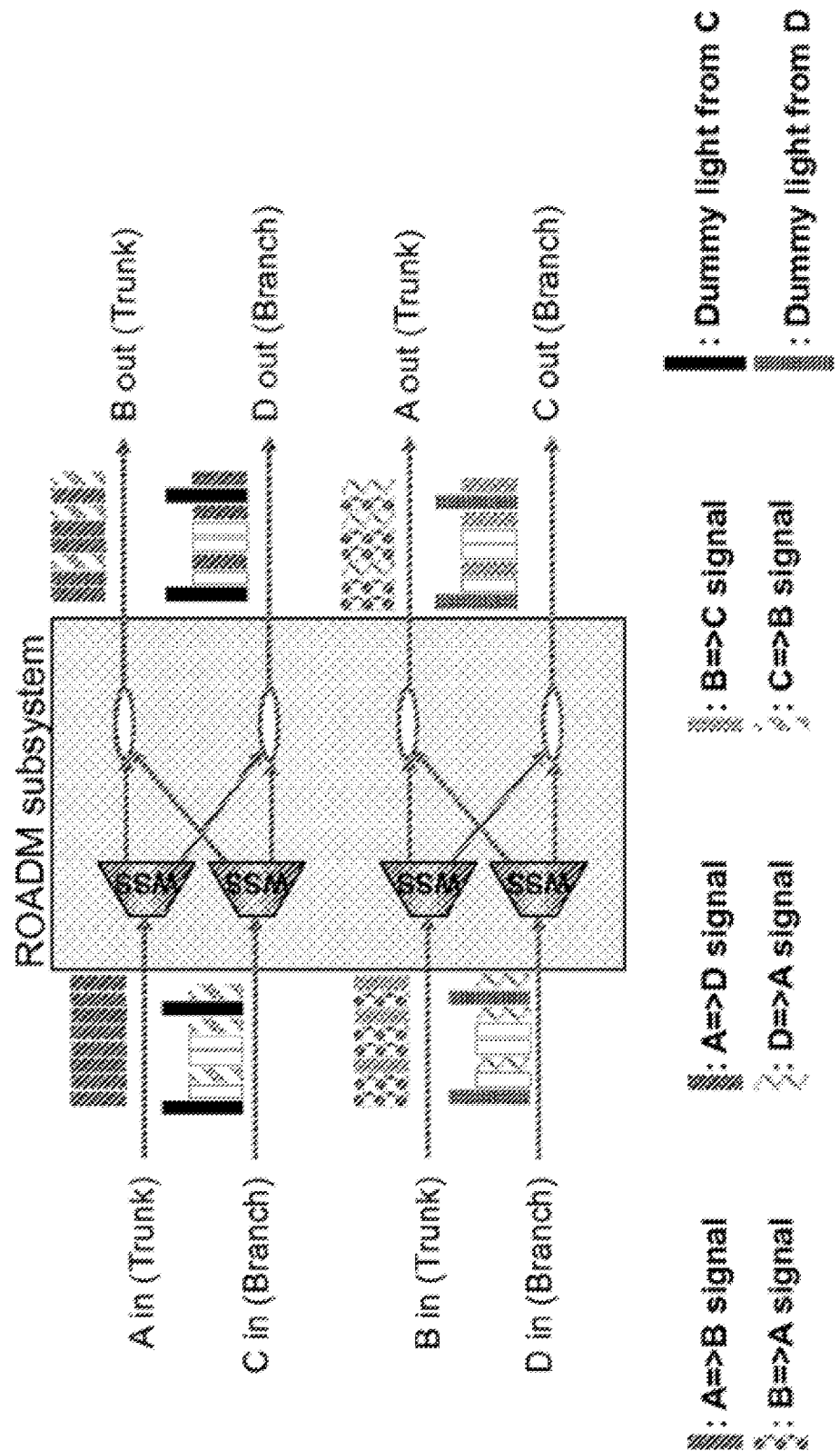
FIG. 5 is a schematic diagram depicting an illustrative switch-coupler WSS-based ROADM subsystem according to an aspect of the present disclosure.

A similar configuration—called switch-coupler (SC) configuration—is shown in FIG. 5. As may be observed in that figure, WSS's are placed at an input end (1×2 WSS's, instead of 2×1 WSS's), and optical couplers (generally same device as optical splitters) are placed at the output end. This is the same configuration (See, e.g., FIG. 8 of Ref [1]). This configuration shown in FIG. 5 exhibits the same feature(s) as the configuration in FIG. 4 namely, full reconfigurability, no more than 4 WSS, while also exhibiting the same infirmity(ies) namely that it cannot maintain ROADM function when any WSS fails.

Therefore, it can be noted that one significant limitation of contemporary ROADM design is that it cannot maintain ROADM function during WSS failure. Accordingly, and as provided by an aspect of the present disclosure, providing redundancy protection without requiring additional WSS hardware would represent a significant advance in the art.

Figure 6:
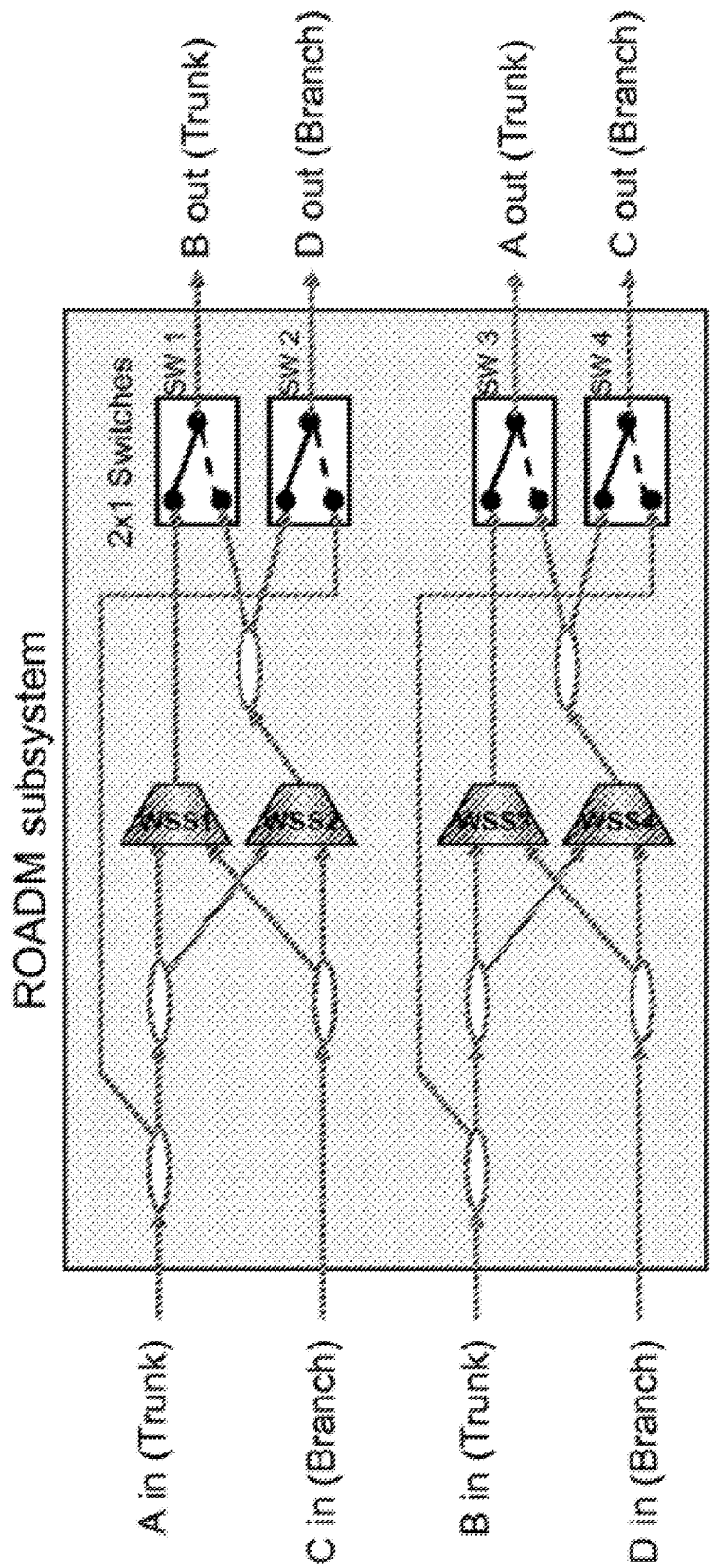
FIG. 6 is a schematic diagram depicting an illustrative prior art technique of adding redundancy protection by splitters and 2×1 switches.

A prior art design to add redundancy employs 2×1 switches and additional fiber connections, as shown in schematically in FIG. 6. As may be observed from that figure, there is an additional splitter at an input from Trunk Terminal A. An input signal is split into two paths, one is the original path similar to that shown in FIG. 4, the other is sent to Switch 2 for redundancy purpose. In a configuration such as that shown in the figure, when WSS 1 fails, switch 1 is set so that the B output takes signal from WSS 2 (which is reconfigured according to provide traffic to Trunk Terminal B) and Switch 2 is also set to take the input A signal from the redundancy splitter for output to Branch Terminal D. If WSS 2 fails, WSS 1 and Switch 1 remain unchanged to provide traffic for Trunk Terminal B, but Switch 2 is switched to take the input A signal from the redundancy splitter for output to Branch Terminal D. Similar protection is used for the section for WSS 3 and WSS 4.

While being able to provide redundancy during single WSS failures or some cases of simultaneous two WSS failure (one from WSS1 and WSS2, and one from WSS3 and WSS4), the configuration shown in FIG. 6 cannot survive that situation when both WSS1 and WSS2 fail at the same time, or when both WSS3 and WSS4 fail at the same time.

Figure 7:
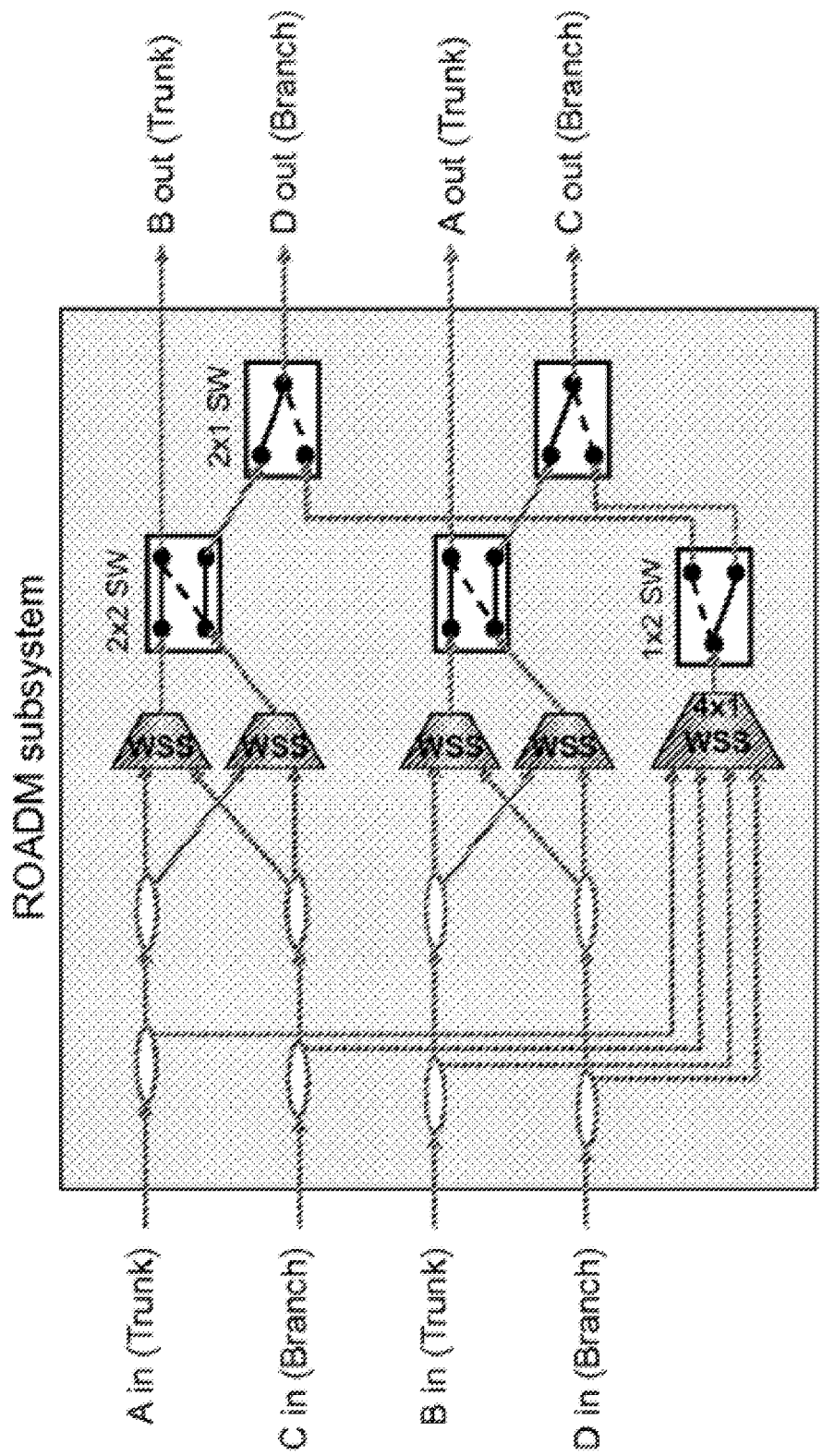
FIG. 7 is a schematic block diagram depicting an illustrative prior art technique for adding redundancy by adding protection by 4×1 WSS.

Another design employs additional 4×1 WSS as well as four optical splitters, two 2×2 switches, two 2×1 switches, and one 1×2 switches, as shown in FIG. 7. As may be appreciated by inspecting that figure, all input signals are split into two paths, one normal working path and one for backup. The 4×1 WSS works with other optical switches to provide WSS functionality in case one of the four original WSS fails. However, it requires 5 WSS's, and an additional WSS is a 4×1 WSS, which is usually costlier than 2×1 WSS and requires more control elements, and it cannot handle more than one WSS failure at a time.

Figure 8:
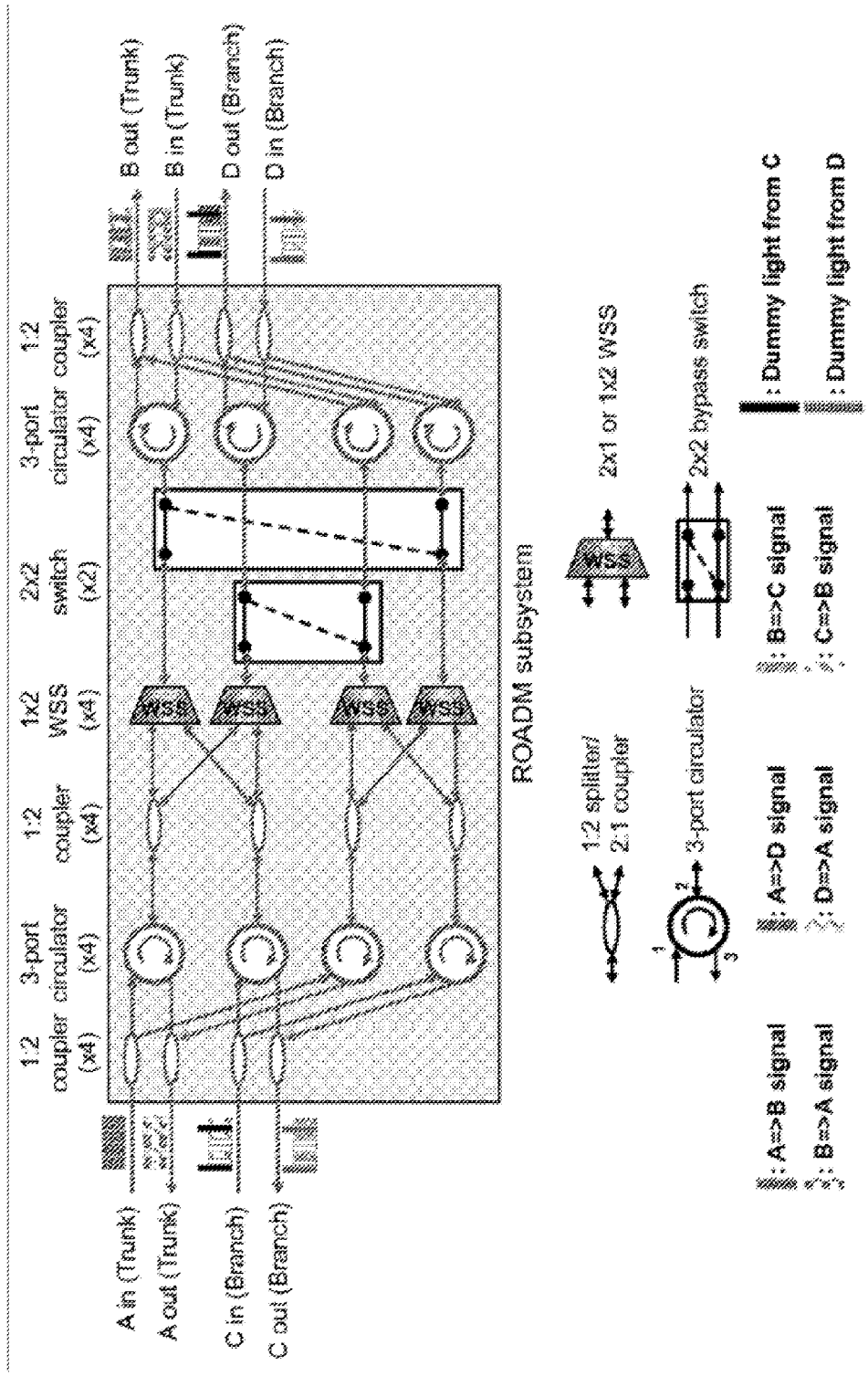
FIG. 8 is a schematic diagram depicting an illustrative prior art technique for adding redundancy protection using bidirectional WSS, circulators, and 2×2 bypass switches.

FIG. 8 shows one of our earlier designs for a low cost secure ROADM branching unit with redundancy protection (See, e.g., REF 5). It uses circulators, 2×2 bypass switches, and WSS's with bidirectional operation to provide redundancy protection and full reconfigurability. Advantageously, it only requires 4 WSS's, and can maintain all switching functions (add/drop/through) when up to 2 WSS fail. It also provides secure data Secure data delivery capability, which means that only the intended channels will reach each destination terminal (no matter it is a branch terminal or trunk terminal), and therefor data and information carried in each WDM channel cannot be received at unintended terminal. However, one drawback of this configuration is that it requires optical signals to pass through the WSS in both directions simultaneously, which might degrade the transmission performance and integrity of the signal.

Figure 9:
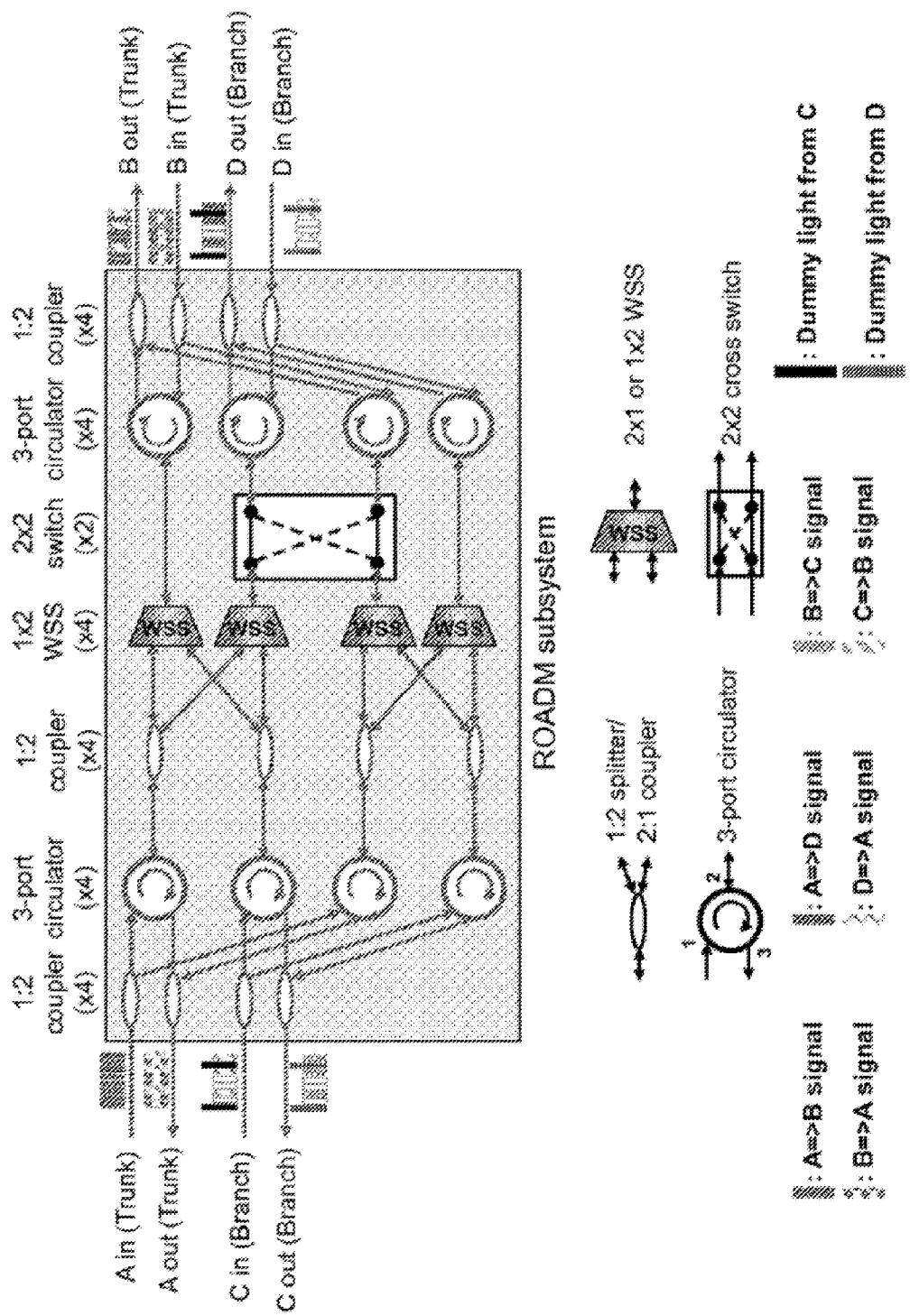
FIG. 9 is a schematic block diagram depicting an illustrative prior art technique for adding redundancy protection using bidirectional WSS, circulators, and 2×2 cross switch.

A slight variation to that configuration is shown FIG. 9. As may be appreciated by those skilled in the art, it uses a 2×2 cross switch, instead of two 2×2 bypass switches, to deliver the same feature. It also has the same issue of requiring bidirectional operation at WSS's.

According to aspects of the present disclosure, we describe two fully reconfigurable ROADM subsystem architecture(s) that achieve redundancy protection against any 2 simultaneous WSS failures while employing only four 2×1 WSS's for both eastbound and westbound traffic, while not requiring bidirectional operation at the WSS's.

As we shall show, ROADM subsystem designs according to the present disclosure advantageously provide low cost, fully functional, and high reliability solutions for ROADM BU. They deliver full reconfigurability and redundancy protection without sacrificing transmission performance.

As we shall show, two basic, illustrative designs for the proposed ROADM BU with redundancy protection will be described. And while we employ these illustrative designs for the purposes of our discussion, the disclosure should not be considered so limiting—as we shall show. Notably, one design employs three 2×2 cross switches and two 2×1 switches—besides the more basic components in WSS-based ROADM BUs shown in FIG. 4 and FIG. 5 (namely four 2×1 or 2×1 WSS's and four 1:2 couplers/splitters). The function of the 2×2 cross switches has been described and detailed (See, e.g., REF 5).

Figure 10:
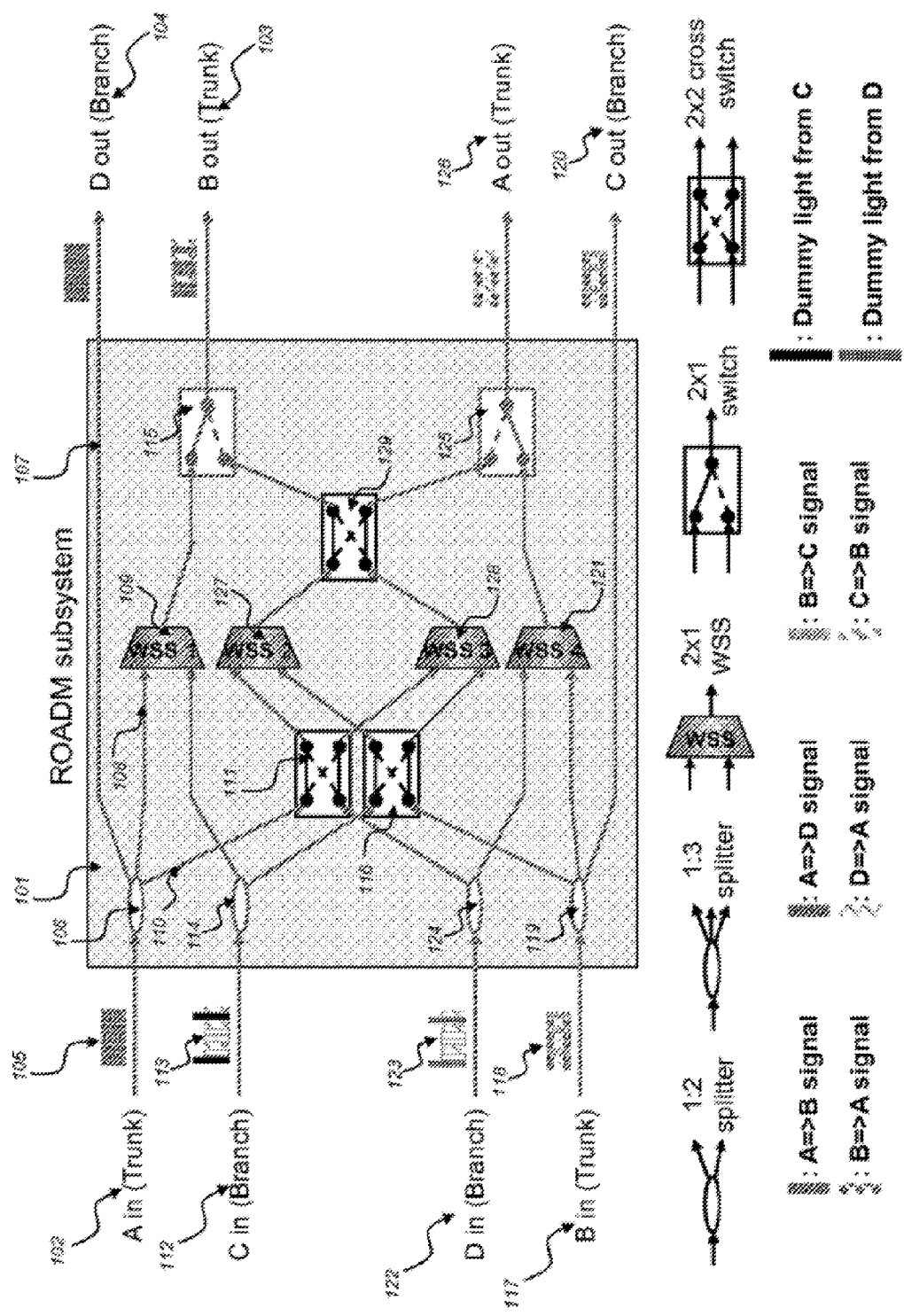
FIG. 10 is a schematic block diagram depicting an illustrative ROADM subsystem with redundancy protection using 2×2 cross switches according to an aspect of the present disclosure.

FIG. 10 shows an illustrative ROADM subsystem (101) according to an aspect of the present disclosure. As may be observed from that figure, an input from a trunk terminal (Terminal A, 102) carries signals for the other trunk terminal (Terminal B, 103) and the branch terminal (Terminal D, 104), represented by solid red bars and solid blue bars separately in 105 respectively. When a signal enters ROADM subsystem 101, it is split into three paths by a 1:3 optical splitter 106. Each path carries the same optical channels/signals, but the optical power levels at these three paths do not need to be equal. The power splitting ratio of the optical splitter can be set according to an insertion loss exhibited by succeeding elements in each path and the network requirement to balance and optimize the power levels among various paths.

Among three output paths, one of them (107) directly exits the ROADM subsystem and is sent to the branch terminal D (104). Even though it contains both the channels for terminal D and the channels for the trunk terminal B, the receiver at the Branch Terminal D can use a wavelength blocker to remove unintended channels first, or select the correct channel(s) to be received by using an optical filter, demultiplexer, or channel selection feature of coherent optical receiver(s). The second path (108) is sent to the first input of a 2×1 wavelength selective switch (109). The third path (110) is sent to a 2×2 cross switch (111) for redundancy protection operation Continuing with our discussion of FIG. 10, the input from branch terminal C (112) contains signal(s) for trunk terminal B, as represented in the figure by the striped green bars in 113. It also contains some dummy lights to maintain the constant power level in a submarine transmission link. These dummy lights are represented in the figure by the solid black bars in 113. It does not need to fill in all the empty channels, as long as total power level is balanced.

This signal(s) are split into two paths by a 1:2 optical splitter (114). The first path goes to the second input of the 1×2 WSS 109. The WSS selects the signals intended for branch terminal B (represented by the red bars from terminal A input, and the striped green bars from terminal C input), and block the unintended signals (represented by the blue bars from terminal A input, and the black bar dummy light from the terminal C input). This signal is sent to the first input of a 1×2 optical switch (115) to be sent to destination trunk terminal B. The second path from the splitter (114) goes to the input of another 2×2 optical switch (116) for redundancy protection operation. Similar to before, the splitting ratio at the splitter (114) does not need to be equal. Instead it can be set according to the system needs.

Similarly, the input from the other trunk terminal B (117) carries signals for trunk terminal A and signals for branch terminal C, represented by checked red bars and solid green bars in 118 respectively. It is first split into three paths by the splitter (119). One path exits the ROADM subsystem and goes to the branch terminal C (120) to be selectively received. The second path goes to an input of a 2×1 WSS (121). The third path goes to the other input of the 2×2 cross switch (116).

The input from branch terminal D (122) contains signals for trunk terminal A, as represented by the checked blue bars in 123, as well as dummy lights represented by shaded black bars in 123. It is split into two paths by a splitter (124). One path goes to the second input of WSS (121), and the other path goes to the other input of 2×2 cross switch (111). The WSS (121) selects the intended signals for trunk terminal A, which are sent to another 2×1 optical switch (125) to be sent to terminal A (126).

A first output of first 2×2 cross switch (111) and first output of second 2×2 cross switch (116) are sent to two inputs of another WSS (127). The second outputs of these two 2×2 cross switches are sent to the two inputs of yet another WSS (128). These two WSS's are used for redundancy protection operation. The outputs of these two WSS's are sent to inputs of third 2×2 cross optical switch (129), and the output of the 2×2 switch (129) are sent to the second input of the two 2×1 switches (115 and 125) respectively.

During normal operation, i.e. the two main WSS's (109 and 121) function normally, the signals for trunk terminal B are selected by WSS 109, and the signals for trunk terminal A are selected by WSS 121. The two 2×1 optical switches (115 and 125) are set at the default state (i.e. connecting the first input to the output). The three 2×2 cross switches and the two backup WSS's (127 and 128) are not used, therefore their states are not relevant (this also includes the situation when one or both backup WSS's fail but both main WSS's are working, in which case the ROADM BU will function normally). Note that they can be put at hibernation state to conserve energy, if such feature is available. Furthermore, it is desirable to use optical switches with latching capability, so that they do not consume any energy once they are set to the target switching state.

As for the signals for the branch terminals D (104) and C (120), since they only go through a passive optical splitter (106 and 119 respectively), the output signals are always the same, regardless of the working condition(s) and switching state(s) of the WSS's and the optical switches. The selection function is performed at the destination terminal. Therefore, signals for branch terminals will not suffer from switch failure and does not require redundancy protection.

When one of the main WSS's (say, 109) fails, the backup WSS 127 is activated and provides the backup operation. The WSS 127 is configured the same way as 109. All three 2×2 cross switches (111, 116, and 129) are set at the bar state. Since signals entering WSS 127 are exactly the same as the signals entering WSS 109 due to optical splitters 106 and 114, the output of WSS 127 has the same signals intended for trunk terminal B (103). They are sent through the 2×2 cross switch 129 (at bar state) to the second input of switch 115. Switch 115 is now switched to connect the second input to the output. Therefore, signals intended for trunk terminal B (103) will be selected and sent properly. It can be noted that in such case it does not matter whether WSS 128 is working or not. Therefore, this case includes the simultaneous failure of WSS's 109 and 128.

Similarly, if WSS 121 fails, the backup WSS 128 is used, all three 2×2 cross switches are also set to bar state, and switch 125 is switched to the second input (represented as top input in FIG. 10) to receive signals from WSS 128 instead of from WSS 121 for trunk terminal A. This case also includes the simultaneous failure of WSS's 121 and 127.

The above operation also operates for the case when both WSS 109 and WSS 121 fail simultaneously. Under such situation, both backup WSS's are used, all three 2×2 cross switches are set at the bar state, and the two 2×1 switches select the second (backup) input. The ROADM BU will still function normally.

As will now be appreciated, if both main and backup WSS for one trunk input fail, for example, both WSS 109 and WSS 127 fail, while both WSS 121 and WSS 128 work, the ROADM subsystem can be configured to provide the same switching function. In such case, the WSS 121 still operates to select the signals for trunk terminal A (126), and the 2×2 optical switch 125 is still set to the first input, which takes the output from WSS 121 to the output for trunk terminal A (126). But the three 2×2 cross switches are set to the cross state. The first two 2×2 switches (111 and 116) switches the input signals from trunk terminal A and branch terminal C to WSS 128. Now the WSS 128 is configured to provide the same function as original working WSS 109. Its output is sent to the second input of 2×1 switch 115 via the third 2×2 switch 129 at the cross state, and is then sent to the output for trunk terminal B (103). Therefore, the ROADM BU still provides the full ROADM function normally. Vice versa for simultaneous failure of WSS's 121 and 128. In such a situation WSS 127 takes over the function of WSS 121, while WSS 109 still operates as normal. The three 2×2 switches are set to the cross state, 2×1 switch 115 takes the first (original) input, while switch 125 takes the second (backup) input.

In summary, when a single WSS (109 or 121 or 127 or 128) fails, the ROADM BU will provide the same full switching capability. When any two WSS's fail simultaneously (including all 6 cases of 127 and 128, 109 and 128, 121 and 127, 109 and 121, 109 and 127, 121 and 128), the ROADM BU will still provide the same full switching capability. Therefore, this architecture provides redundancy protection for simultaneous up to any two WSS failures without requiring bidirectional operation at any components (esp. WSS). It also meets other requirements such as only using 2×1 or 1×2 WSS's, and requiring only up to 4 WSS's. It also provides power balance in all branches through the use of WSS wavelength selection and dummy lights.

As now shown above, in all original and backup cases, all three 2×2 cross switches (111, 116 and 129) have the same states (either all in the bar states, or all in the cross states). Therefore, only one set of controller is required to control these three switches, and only single command is needed, which is shared among these three switches. This simplifies the control complexity and reduces the controller hardware (electronic, mechanical, etc.) requirement.

The insertion loss due to the optical components in the ROADM subsystem is also acceptable. Assuming typical loss figures of 5 dB for 2×1 WSS, 3.3 dB for 1:2 splitter, 5.5 dB for 1:3 splitter, 0.5 dB for 2×1 switch, and 0.8 dB for 2×2 cross switch, the insertion loss figures under normal operation (the two main working WSS's function properly) are 11 dB for the trunk to trunk signals, 5.5 dB for the trunk to branch signals, 8.8 dB for the branch to trunk signals respectively. When WSS failure(s) occurs, the insertion loss figures will increase to 12.6 dB for the trunk to trunk signals, and 10.4 dB for the branch to trunk signals respectively, while the branch to branch signal remains at 5.5 dB regardless. These figures are based on equal splitting ratios at the splitters. However, as stated above, the splitting ratios can be set to optimize the loss figures at different paths. These losses can be compensated by optical amplifiers in the ROADM BU.

Figure 11:
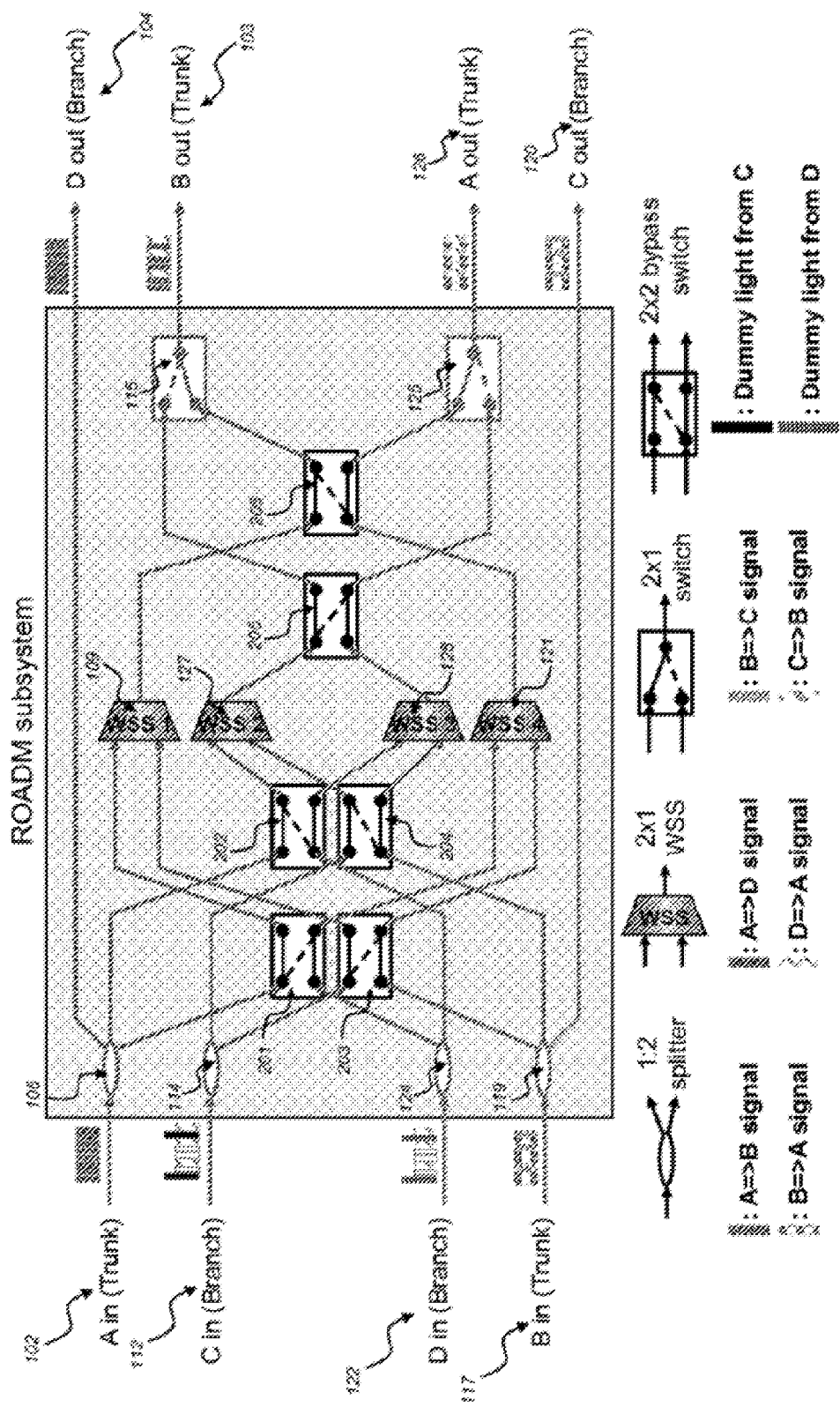
FIG. 11 is a schematic block diagram depicting an illustrative ROADM subsystem with redundancy protection using 2×2 bypass switches according to an aspect of the present disclosure.

We now describe another design according to the present disclosure—similar to the first design previously described—but instead of using 2×2 cross switches, it uses 2×2 bypass switches, since sometimes the cross switches are not available. The architecture according to the present disclosure is shown in FIG. 11 and employs six 2×2 bypass switches With reference now to that FIG. 11, an input from trunk terminal A (102) is first split into three paths, same as in the first design. However, except for the first path that goes directly to the output for branch terminal (104), each of the remaining two paths goes to a 2×2 bypass switches (201 and 202 respectively). These two bypass switches have opposite switching configurations, as illustrated FIG. 11. At the bypass state, switch 201 connects Input 1 to Output 2 only, while switch 202 connects Input 2 to Output 1 only.

As may be observed, the input from branch terminal C (112) is also split into two paths—same as the first design.

However, both paths are sent to 2×2 bypass switches (203 and 204 respectively). These two 2×2 bypass switches also have opposite switching configurations. At the bypass state, switch 203 connects Input 1 to Output 2 only, while switch 204 connects Input 2 to Output 1 only.

Similar configurations apply to input from the other trunk terminal (terminal B, 117) and the other branch terminal (terminal C, 122).

Among the first four 2×2 bypass switches (201-204), switches 201 and 203 are for main working paths, while switches 202 and 204 are backup switches for redundancy operation. The outputs of a main 2×2 bypass switch (201) go to the two main WSS's (109 and 121) respectively. Same for the outputs of the other main switch (203). The outputs of a backup 2×2 bypass switch (202) go to the two backup WSS's (127 and 128) respectively, same for the outputs of the other backup switch (204).

The output of the two main WSS's (109 and 121) goes to the inputs of the fifth 2×2 bypass switch (205), which is for the main working paths. The two outputs of this switch goes to the first (main) input of two 2×1 optical switches (115 and 125) respectively. The output of the two backup WSS's (127 and 128) goes to the inputs of the sixth 2×2 bypass switch (206), which is for the backup paths. The two outputs of this switch go to the second (backup) input of the two 2×1 optical switches (115 and 125) respectively. Bypass switches 205 and 206 also have opposite switching configurations. At the bypass state, switch 206 connects Input 1 to Output 2 only, while switch 205 connects Input 2 to Output 1 only.

During normal operation, two main WSS's (109 and 121) are configured to select and switch the appropriate signals to the two trunk terminals (B and A) respectively. The three main 2×2 bypass switches (201, 203 and 205) are set to the bar state, and the two 2×1 switches (115 and 125) are set to connect the main input to the output. This provides full ROADM BU function. The other three 2×2 bypass switches (202, 204 and 206) and two backup WSS's (127 and 128) are not used, and their switching states are not relevant. Therefore, this includes the situation where one or both backup WSS's (127 and 128) fail.

When one of the main WSS's (say, 109) fails, the backup WSS 127 is activated and provides the backup operation. The WSS 127 is configured the same way as 109. The three corresponding 2×2 bypass switches (202, 204 and 206) are set to the bar state. Since the signals entering WSS 127 are exactly the same as the signals entering WSS 109, the output of WSS 127 has the same signal intended for trunk terminal B. As may be observed, it is sent through the switch 206 to the second output of switch 115 (shown as the upper input port on FIG. 11).

Continuing with this example, switch 115 is now switched to the second (backup) input, which contains the correct signal for terminal B (103). It can be noted that in such case does not matter whether WSS 128 is working or not. Therefore, this case includes the simultaneous failure of WSS's 109 and 128. In this case, WSS 121 is still used for outputs for trunk terminal A, the three main 2×2 bypass switches are still set to the bar state, and switch 125 still takes signals from the first (main) input (shown as the upper input port in FIG. 11).

Similarly, if WSS 121 fails, the backup WSS 128 is used, all six 2×2 bypass switches (201-206) are set to the bar state, switch 125 is still switched to the first (main) input (shown as the lower input port on FIG. 11), but switch 125 is switched to the second (backup) input (shown as the lower input port on FIG. 11) to take the signals from WSS 128 instead of from WSS 121 for trunk terminal A (126). This case also includes the simultaneous failure of WSS's 121 and 127.

As will now be readily appreciated, the above outlined operation also operates for those situations when both WSS 109 and WSS 121 fail simultaneously. In such situation(s), both backup WSS's are used, all three corresponding 2×2 bypass switches are set at the bar state, and the two 2×1 switches select the second (backup) input. The ROADM BU will still function normally.

Note that if both the main and backup WSS for one trunk input fail, for example, if both WSS 109 and WSS 127 fail, while both WSS 121 and WSS 128 remain operating properly, the ROADM subsystem can be configured to provide the same switching function. In such a case, the WSS 121 is used to process signals for trunk terminal B (instead of for trunk terminal A). In other words, WSS 121 is set to the original configuration of WSS 109, while WSS 128 takes over the original configuration of WSS 121. Here the three corresponding 2×2 bypass switches (201, 203 and 205) are still set to the bypass state, and switch 115 remains at the main state which connects the first (main) input to the output. The input signals from trunk terminal A (102) go through the third output of optical splitter 106, then go through the switch 201 at bypass state, to reach the first input of WSS 121. The input signals from branch terminal C (112) go through the second output of optical splitter 114, then go through the switch 203 at bypass state, to reach the second input of WSS 121. WSS 121 selects the appropriate signals intended for trunk terminal B, which are sent through switch 205 at bypass state to reach the first (main) input of the 2×1 switch 115, and then go to destination trunk terminal B.

At the same time, the signals for trunk terminal A (126) are processed in WSS 128 (instead of WSS 121 originally), therefore WSS 128 is set to the original configuration of WSS 121. The three corresponding 2×2 bypass switches are 202, 204 and 206. They are all set to the bar state. The input signals from trunk terminal B (117) go through the second output of optical splitter 119, then go through the switch 204 at bar state, to reach one port of WSS 128. The input signals from branch terminal D (122) go through the second output of optical splitter 124, then go through the switch 202 at bar state, to reach the other port of WSS 128. WSS 128 selects the appropriate signals intended for trunk terminal A, which are sent through switch 206 at the bar state to reach the second (backup) input of the 2×1 switch 125, and then go to destination trunk terminal A.

As for signals for branch terminals C and D, since they only go through a passive optical splitter, the output signals are always the same, regardless of the working condition and switching states of the WSS's and other optical switches. The selection function is performed at the destination terminal. Therefore, signals for branch terminals will not suffer from switch failure and does not require redundancy protection.

In summary, when a single WSS (109 or 121 or 127 or 128) fails, the ROADM BU will provide the same full switching capability. When any two WSS's fail simultaneously (including all 6 cases of 127 and 128, 109 and 128, 121 and 127, 109 and 121, 109 and 127, 121 and 128), the ROADM BU will still provide the same full switching capability. Therefore, this architecture provides redundancy protection for simultaneous up to any two WSS failures. It also meets other requirements such as only using 2×1 or 1×2 WSS's, and requiring only up to 4 WSS's. It also provides power balance in all branches through the use of WSS wavelength selection and dummy lights.

As described and shown above, in all the original and backup cases, the three 2×2 bypass switches in the working path (201, 203 and 205) always have the same states (either all in the bar states, or all in the bypass states), and similarly the three 2×2 bypass switches in the back path (202, 204 and 206) always have the same states (either all in the bar states, or all in the bypass states). Therefore, only one controller is required to control each set of three switches, and only single command is needed for each set, which is shared among these three switches within the set. This simplifies control complexity and reduces controller hardware (electronic, mechanical, etc.) requirement(s).

Note further that any insertion loss due to the optical components in the ROADM subsystem is also acceptable. Due to the ROADM subsystem design and the use of 2×2 bypass switches, the insertion loss figures under normal operation with main components and under backup operation with redundant components are the same, since they pass through the same number of optical components regardless of normal operation or backup operation. Assuming typical loss figures of 5 dB for 2×1 WSS, 3.3 dB for 1:2 splitter, 5.5 dB for 1:3 splitter, 0.5 dB for 2×1 switch, and 0.6 dB for 2×2 bypass switch, the insertion loss figures under both the normal operation and all backup operations are 12.2 dB for the trunk to trunk signals, 5.5 dB for the trunk to branch signals, 10 dB for the branch to trunk signals respectively. These figures are based on equal splitting ratios at the splitters. However as stated above, the splitting ratios can be set to optimize the loss figures at different paths. These losses can be compensated by optical amplifiers in the ROADM BU.

We note that in comparing between the two described designs according to the present disclosure, the first exhibits a slightly lower insertion loss figure, while the second maintains loss levels among all working/backup settings.

Advantageously—and as will be readily appreciated by those skilled in the art, ROADM subsystems with redundancy protection according to the present disclosure can advantageously be applied in submarine branching unit (as shown illustratively in FIG. 2(*b*)) to construct low cost ROADM branching unit with redundancy protection.

As will now be readily appreciated by those skilled in the art, systems, structures and methods according to the present disclosure employ at least one WSS in all paths such that full reconfigurability and secure data delivery is provided; backup WSS and relevant components are employed to provide redundancy in hardware and light paths; the combination and interconnection of 2×2 switches, 1×2 switches, optical splitters, and WSS's within a ROADM subsystem of an illustrative submarine branching unit advantageously achieves redundancy protection for up to simultaneous failures of any two WSS's; method(s) according to the present disclosure that switch/set corresponding switches and WSS's during different component failure situations maintain full ROADM functions in a branching unit; and the use of switching schemes and dummy channels to realize optical power balance at all fiber links without requiring new dummy light generated at the ROADM BU.

Further features and aspects of systems, structures and methods according to the present disclosure are worth repeating at this time and include at least: relatively low cost—only requires four 1×2 WSS's; allows full reconfigurability; optical power balance at all fiber links is maintained without requiring new dummy light generated; redundancy protection (for up to any 2 simultaneous WSS failures, all ROADM functions and secure data delivery feature are maintained; and satisfactory optical performance (low/reasonable insertion loss, does not require optical signals to pass through a WSS at both directions simultaneously)

At this point, while we have presented this disclosure using some specific examples, those skilled in the art will recognize that our teachings are not so limited. Accordingly, this disclosure should be only limited by the scope of the claims attached hereto.

The invention claimed is:

1. A reconfigurable optical add/drop multiplexing (ROADM) system comprising:
    first, second, third and fourth inputs and first, second, third and fourth outputs;
    first, second, third and fourth wavelength selective switches (WSS);
    first and second 1×3 optical splitters;
    first and second 1×2 optical splitters;
    first, second and third 2×2 cross switches; and
    first and second 1×2 switches;
    wherein the inputs, outputs, WSS, splitters, cross-switches, and switches are configured such that
        the first 1×3 optical splitter having an input connected to the first input of the ROADM, a first output connected to the first output of the ROADM, a second output connected to a first input of the first WSS, and a third output connected to a first input of the first cross-switch;
        the second 1×3 optical splitter having an input connected to the fourth input of the ROADM, a first output connected to a second input of the second cross-switch, a second output connected to a second input of the fourth WSS, and a third output connected to the fourth output of the ROADM;
        the first 1×2 optical splitter having an input connected to the second input of the ROADM, a first output connected to a second input of the first WSS and a second output connected to a first input of the second cross-switch;
        the second 1×2 optical splitter having an input connected to the third input of the ROADM, a first output connected to a second input of the first cross-switch and a second output connected to a first input of the fourth WSS;
        the first cross-switch having a first output connected to a first input of the second WSS and a second output connected to a first input of the third WSS;
        the second cross-switch having a first output connected to a first input of the second WSS and a second output connected to a second input of the third WSS;
        the first WSS having an output connected to a first input of the first 2×1 switch;
        the second WSS having an output connected to a first input of the third cross-switch;
        the third WSS having an output connected to a second input of the third cross-switch;
        the fourth WSS having an output connected to a second input of the second 2×1 switch;
        the third cross-switch having a first output connected to a second input of the first 2×1 switch and a second output connected to a first input of the second 2×1 switch;
        the first 2×1 switch having an output connected to the second output of the ROADM; and
        the second 2×1 switch having an output connected to the third output of the ROADM.

2. The ROADM of claim 1 wherein the 1×2 splitters are substantially 50:50 splitters.

3. The ROADM of claim 1 wherein two of the inputs of the ROADM are trunk inputs and two of the inputs of the ROADM are branch inputs.

4. The ROADM of claim 3 wherein two of the outputs of the ROADM are trunk outputs and two of the outputs of the ROADM are branch outputs.

5. The ROADM of claim 4 wherein the first and fourth inputs of the ROADM are trunk inputs and the second and third outputs are trunk outputs.

6. The ROADM of claim 5 wherein the second and third inputs of the ROADM are branch inputs and the first and fourth outputs are branch outputs.

7. A reconfigurable optical add/drop multiplexing (ROADM) system comprising:
   first, second, third and fourth inputs and first, second, third and fourth outputs;
   first, second, third and fourth wavelength-selective-switches (WSS);
   first and second 1×3 optical splitters;
   first and second 1×2 optical splitters;
   first, second, third, fourth, fifth, and sixth 2×2 bypass-switches; and
   first and second 1×2 switches;
   wherein the inputs, outputs, WSS, splitters, bypass-switches and switches are configured such that
      the first 1×3 optical splitter having an input connected to the first input of the ROADM, a first output connected to the first output of the ROADM, a second output connected to a first input of the third bypass-switch, and a third output connected to a first input of the first bypass-switch;
      the second 1×3 optical splitter having an input connected to the fourth input of the ROADM, a first output connected to a second input of the second bypass-switch, a second output connected to a second input of the fourth bypass-switch, and a third output connected to the fourth output of the ROADM;
      the first 1×2 optical splitter having an input connected to the second input of the ROADM, a first output connected to a first input of the fourth bypass-switch and a second output connected to a first input of the second bypass-switch;
      the second 1×2 optical splitter having an input connected to the third input of the ROADM, a first output connected to a second input of the first bypass-switch and a second output connected to a second input of the third bypass-switch;
      the first bypass-switch having a first output connected to a first input of the first WSS and a second output connected to a first input of the fourth WSS;
      the second bypass-switch having a first output connected to a second input of the first WSS and a second output connected to a second input of the fourth WSS;
      the third bypass-switch having a first output connected to a second input of the second WSS and a second output connected to a first input of the third WSS;
      the fourth bypass-switch having a first output connected to a second input of the second WSS and a second output connected to a second output of the third WSS;
      the first WSS having an output connected to a first input of the sixth bypass-switch;
      the second WSS having an output connected to a first input of the fifth bypass-switch;
      the third WSS having an output connected to a second input of the fifth bypass-switch;
      the fourth WSS having an output connected to a second input of the sixth bypass-switch;
      the fifth bypass switch having a first output connected to a first input of the first 2×1 switch and a second output connected to a second output of the second 2×1 switch;
      the sixth bypass switch having a first output connected to a second input of the first 1×2 switch and a second output connected to a first output of the second 1×2 switch;
      the first 1×2 switch having an output connected to the second output of the ROADM; and
      the second 1×2 switch having an output connected to the third output of the ROADM.

8. The ROADM of claim 7 wherein the 1×2 splitters are substantially 50:50 splitters.

9. The ROADM of claim 7 wherein two of the inputs of the ROADM are trunk inputs and two of the inputs of the ROADM are branch inputs.

10. The ROADM of claim 9 wherein two of the outputs of the ROADM are trunk outputs and two of the outputs of the ROADM are branch outputs.

11. The ROADM of claim 10 wherein the first and fourth inputs of the ROADM are trunk inputs and the second and third outputs are trunk outputs.

12. The ROADM of claim 11 wherein the second and third inputs of the ROADM are branch inputs and the first and fourth outputs are branch outputs.

* * * * *